(12) United States Patent
Ding et al.

(10) Patent No.: US 9,454,572 B2
(45) Date of Patent: Sep. 27, 2016

(54) OUT-OF-PLACE MATERIALIZED VIEW REFRESH

(71) Applicant: Oracle International Corporation, Redwood Shores, CA (US)

(72) Inventors: Luping Ding, Westford, NH (US); Tsae-Feng Yu, Westford, NH (US); Andrew Witkowski, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 265 days.

(21) Appl. No.: 13/826,726

(22) Filed: Mar. 14, 2013

(65) Prior Publication Data

US 2014/0280029 A1 Sep. 18, 2014

(51) Int. Cl.
*G06F 17/30* (2006.01)
*G06F 7/00* (2006.01)

(52) U.S. Cl.
CPC ... *G06F 17/30457* (2013.01); *G06F 17/30383* (2013.01); *G06F 17/30418* (2013.01)

(58) Field of Classification Search
CPC .................. G06F 17/30457; G06F 17/30595; G06F 17/30312; G06F 17/30463; G06F 17/30592
USPC .......................................................... 707/717
See application file for complete search history.

(56) References Cited

U.S. PATENT DOCUMENTS

| | | | |
|---|---|---|---|
| 6,581,205 B1 * | 6/2003 | Cochrane .......... G06F 17/30383 706/45 |
| 6,965,899 B1 * | 11/2005 | Subramaniam ... G06F 17/30339 |
| 7,734,602 B2 | 6/2010 | Folkert et al. |
| 2004/0122828 A1 | 6/2004 | Sidle et al. |
| 2004/0225666 A1 | 11/2004 | Hinshaw |
| 2006/0122964 A1 * | 6/2006 | Yu ..................... G06F 17/30383 |
| 2006/0253483 A1 | 11/2006 | Yu |
| 2007/0226203 A1 * | 9/2007 | Adya ................. G06F 17/30418 |
| 2009/0037462 A1 * | 2/2009 | Pearson ............ G06F 17/30362 |
| 2009/0182779 A1 | 7/2009 | Johnson |
| 2009/0319476 A1 | 12/2009 | Olston et al. |
| 2010/0332526 A1 * | 12/2010 | Nori .................. G06F 17/30297 707/769 |
| 2011/0106790 A1 | 5/2011 | Gupta et al. |
| 2012/0131589 A1 | 5/2012 | Golab et al. |

OTHER PUBLICATIONS

Randall B. Bello et al, "Materialized Views in Oracle", Proceedings of the 24th International Conference on Very Large Databases, Aug. 24-27, 1998, pp. 659-664.

(Continued)

*Primary Examiner* — Usmaan Saeed
*Assistant Examiner* — Raquel Perez-Arroyo
(74) *Attorney, Agent, or Firm* — Hickman Palermo Becker Bingham LLP; Daniel D. Ledesma

(57) ABSTRACT

Techniques are provided for performing a refresh or update of a materialized view without modifying the materialized view. Such a refresh is referred to as an out-of-place materialized view refresh. An out-of-place materialized view refresh involves creating one or more outside tables into which data will be inserted. During the refresh, the materialized view may be accessible for query processing, even though the materialized view contains "stale" data. After the insertion, the one or more outside tables are made accessible for query processing and future queries will target the one or more outside tables instead of the materialized view.

24 Claims, 5 Drawing Sheets

(56) References Cited

OTHER PUBLICATIONS

Burt L. Vialpando et al., "Comparing DB2 materialized query tables and Oracle materialized views" http://www.ibm.com/developerworks/data/library/techarticle/dm-0708khatri/, dated 2007, 20 pages.

Petrus Chan, "A First Look at Materialized Query Table (MQT) in DB2 LUW", IBM Software Group, technical slides, 2009, 44 pages.

Eric Hanson et al., "Improving Performance with SQL Server 2008 Indexed Views", SQL Server Technical Article, Oct. 2008, 30 pages.

Grace Au et al., "Introduction to Materialized Views in Teradata", 541-0003506B01, Oct. 25, 2002, 31 pages.

Jose A. Blakeley et al., "Efficiently Updating Materialized Views", Proceedings of the 1986 ACM SIGMOD international conference on Management of data, May 28-30, 1986, pp. 61-71.

Latha S. Colby et al., "Algorithms for Deferred View Maintenance", Proceedings of the 1996 ACM SIGMOD international conference on Management of data, Jun. 4-6, 1996, pp. 469-480.

Yue Zhuge et al., "View Maintenance in a Warehousing Environment", Proceedings of the 1995 ACM SIGMOD international conference on Management of data, May 22-25, 1995, pp. 316-327.

Oracle® Database Data Warehousing Guide 11g Release 2 (11.2) E10810-01, http://docs.oracle.com/cd/E14072_01/server.112/e10810.pdf, Aug. 2009, Chapters 8, 9 and 15, 93 pages.

Oracle Database Data Warehousing Guide 10g Release 2. (10.2), https://web.archive.org/web/20111229154246/http://docs.oracle.com/cd/B19306_01/server.102/b14223/toc.htm, dated Dec. 28, 2011.

U.S. Appl. No. 13/826,501, filed Mar. 14, 2013, Office Action, Nov. 19, 2015.

* cited by examiner

OUT-OF-PLACE MATERIALIZED VIEW REFRESH

CROSS-REFERENCE TO RELATED APPLICATION

This application is related to U.S. patent application Ser. No. 13/826,501 filed the same day herewith, the entire contents of which is hereby incorporated by reference for all purposes as if fully set forth herein.

FIELD

Embodiments generally relate to updating a materialized view and, more specifically, to using one or more outside tables to perform an update of a materialized view.

BACKGROUND

In a database management system (DBMS), data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

Embodiments are not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

For various reasons, it is not desirable for certain users to have access to all of the columns of a table. For example, one column of an employee table may hold the salaries for the employees. Under these circumstances, it may be desirable to limit access to the salary column to management, and allow all employees to have access to the other columns. To address this situation, the employees may be restricted from directly accessing the table. Instead, they may be allowed to indirectly access the appropriate columns in the table through a "view".

A view is a logical table. As logical tables, views may be queried by users as if they were a table. However, views actually present data that is extracted or derived from existing tables. Thus, the problem described above may be solved by (1) creating a view that extracts data from all columns of the employee table except the salary column, and (2) allowing all employees to access the view.

A view is defined by metadata referred to as a view definition. The view definition contains mappings to one or more columns in the one or more tables containing the data. Columns and tables that are mapped to a view are referred to herein as base columns and base tables of the view, respectively.

Typically, the view definition is in the form of a database query. These queries, like any database query, must conform to the rules of a particular query language such as the ANSI Structured Query Language (SQL).

The data presented by conventional views is gathered and derived on-the-fly from the base tables in response to queries that access the views. The data gathered for the view is not persistently stored after the query accessing the view has been processed. Because the data provided by conventional views is gathered from the base tables at the time the views are accessed, the data from the views will reflect the current state of the base tables. However, the overhead associated with gathering the data from the base tables for a view every time the view is accessed may be prohibitive.

A materialized view, on the other hand, is a view for which a copy of the view data is stored separate from the one or more base tables from which the data was originally gathered and derived. The data contained in a materialized view is referred to herein as "materialized data." A materialized view eliminates the overhead associated with gathering and deriving materialized data every time a query accesses the materialized view.

When a materialized view is initially created, it is "fresh," meaning the content of the materialized view is in sync with one or more base tables from which the materialized view is based. In response to a database update operation to one of the base table(s), such as an insert, delete, or update, one or more rows of the base table are affected. Once the transaction in which the operation is performed is committed, the materialized view becomes "stale" because the newly inserted rows are not counted in the materialized view. Also, any deleted or updated rows are not reflected in the materialized view either. Once a materialized view becomes stale, the materialized view cannot be used to answer a query, unless the session in which the query is submitted operates in a "stale tolerance" mode. The materialized view must be updated or "refreshed" in order to bring the materialized view up to date.

One approach for refreshing a materialized view is referred to as non-atomic refresh. In non-atomic refresh, the materialized view is truncated as part of the refresh. If a query is executed against the materialized view immediately after the truncate step, then the query result will be inconsistent. Another approach for refreshing a materialized view is referred to as atomic refresh. In atomic refresh, a truncate is not performed; thus, an inconsistent result will not occur. However, the query execution engine will access stale results during the refresh. When the amount of changes to the materialized view are significant, which is typical in data warehouse applications, atomic refresh may take a considerable amount of time (e.g., hours or even days) to perform due to the fact that it must use conventional DML. Non-atomic refresh is usually much more efficient in such cases because non-atomic refresh involves table/partition truncate with a subsequent insert. Therefore, non-atomic refresh is more popular in data warehouse applications.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
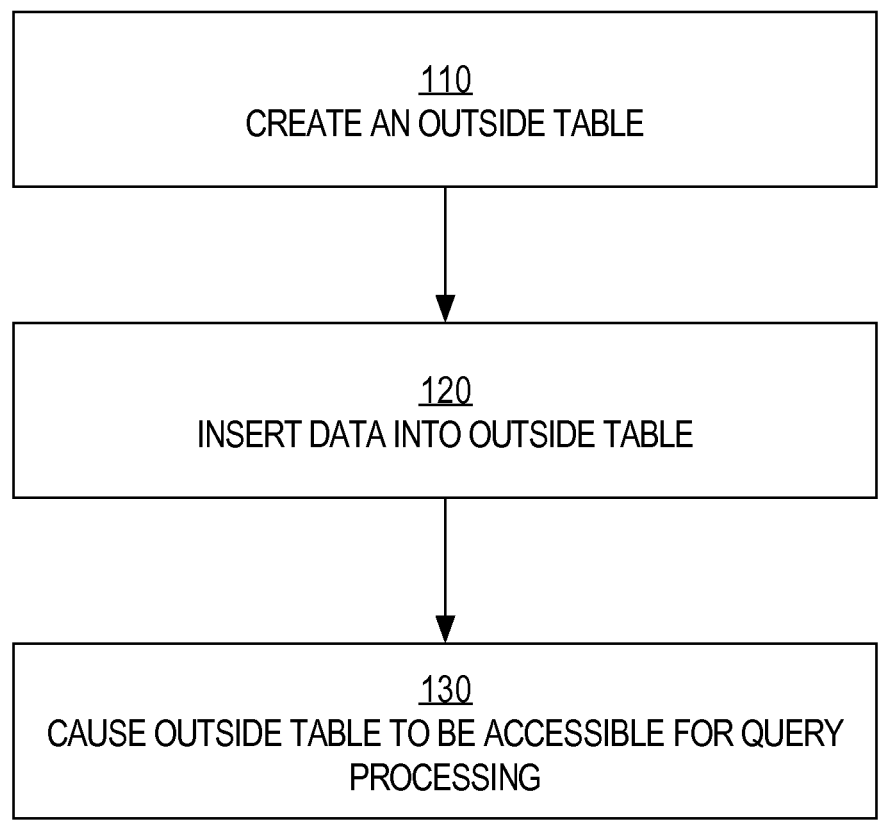
FIG. 1 is a flow diagram that depicts a process for refreshing a materialized view, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for updating (or "refreshing") a materialized view. In a prior approach to updating a materialized view, the materialized view itself is modified. This approach is referred to as "in-place" materialized view refresh. During an in-place refresh, the materialized view may become inaccessible for query processing. In other words, a query execution engine that is processing a query (which may be a rewritten query) that targets the materialized view may not be able to read the materialized view in order to fully process the query. However, such updating could take minutes or hours.

In techniques that are provided herein, a materialized view is not modified during a refresh. Instead, a separate database object is created and data is inserted into the database object. Eventually, the database object "becomes" the updated materialized view through a renaming step. Afterward, the processing of any future queries that target the materialized view will involve accessing the newly-created database object. This approach is referred to herein as an "out-of-place" materialized view refresh. During an out-of-place refresh, the materialized view may still be accessible for query processing.

Database Overview

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types.

Process Overview

FIG. 1 is a flow diagram that depicts a process 100 for updating a materialized view, in an embodiment. Process 100 may be initiated based on one or more initiation criteria. An example criterion is user input, which may be reflected in a database statement that indicates the materialized view and that a refresh operation on the materialized view is requested. The user input may indicate that the refresh operation is to use an "out-of-place" refresh approach. Alternatively, the "out-of-place" refresh approach may be the default approach; thus, the user input that initiates the refresh operation is not required to indicate the "out-of-place" approach.

As another example initiation criterion, process 100 may be initiated in response to determining that the number of updates that have not yet been reflected in the materialized view has reached a threshold number. As another example initiation criterion, process 100 may be initiated in response to determining that the amount of updates (e.g., in MB) that have not yet been reflected in the materialized view has reached a threshold amount.

As another example initiation criterion, process 100 may be initiated automatically based on time. For example, process 100 may be initiated every night at 1:00 AM. As another example, process 100 may be initiated after the lapse of 14 hours since the most recent iteration of process 100.

At block 110, an outside table is created. An outside table is a database object that (1) is separate from a materialized view and any base table of the materialized view and (2) is updated to contain data that reflects a "fresh" (or updated) materialized view. The outside table has many of the attributes as the container table of the materialized view that is being updated. For example, the outside table is in the same tablespace and has the same number of columns, column names, column data types, and partition scheme as the container table of the materialized view.

At block 120, data is inserted into the outside table. Depending on the implementation, the data may be identified based on reading the original base table(s) from which the materialized view is based, the container table of the materialized view, and/or one or more logs that reflect changes that were made to the base table(s). Block 120 may be performed while the materialized view is accessible for query processing. However, any query results that are based on reading the materialized view may be "stale." Nevertheless, some queries or applications do not require up-to-date results and are thus allowed to view stale results.

Direct Path Insert

In an embodiment, block 120 may be performed using direct path insert operation(s). A direct path insertion operation is different than a typical insert operation in one or more ways. For example, a direct path insert operation may involve writing data directly into a data file, while a typical insert operation involves first writing data to a buffer cache before writing the data into a data file. As another example, a direct path insert operation may involve only appending data to the end of existing data in a data file, while a typical insert operation involves using free space in a data file, which free space may have become available due to a previous deletion. As another example, a direct path insert operation may involve inserting data without regard to referential integrity constraints, while a typical insert operation involves inserting data while ensuring referential integrity constraints. As another example, a direct path insert operation may involve inserting data without logging any undo or redo entries, while a typical insert operation requires logging undo and redo entries.

Process Overview (Cont.)

At block 130, the outside table is made accessible for query processing. In other words, a query that targets the materialized view will now be able to read the outside table instead of the "stale" materialized view. Block 130 may involve renaming the outside table to have the same name as the materialized view. Block 130 may also involve renaming the stale materialized view to have a different name. The stale materialized view effectively becomes a "prior version" and may be stored to allow queries to be processed against the stale materialized view, such as queries that rely on data that was current as of a particular point in time, which may correspond to the stale materialized view. Alternatively, the stale materialized view is dropped in order to save space in volatile and/or non-volatile storage.

Also, while block 130 is being performed, both the outside table and the materialized view may be inaccessible for query processing. However, block 130 may be performed in a relatively short amount of time, such as a few milliseconds.

In an embodiment, preventing any processes from accessing the materialized view and the outside table involves the use of database locks. For example, exclusive locks may be applied to metadata of the outside table and the materialized view (e.g., through "DDL" locks) and exclusive locks may be applied to the outside table and the materialized view themselves (e.g., through "DML" locks) to ensure that no other concurrent processes can execute DDL or DML statements on either database object.

In an embodiment, after locking is performed, one or more query plans that depend on the stale materialized view are invalidated.

In an embodiment, after locking is performed, the identities of any registered dependent indexes are swapped. For example, if there are two indexes defined on the original materialized view container table, then the same two indexes are created on the outside table once the outside table is populated. When the outside table is accessible for query processing, the indexes are also made available. The indexes created on the outside table have the same specification as the indexes on the original materialized view container table.

Lastly, the locks on both database objects are released. After this point, the outside table (which is now the "fresh" or current materialized view) is accessible for query processing.

Refresh Techniques

Multiple techniques may be used to perform a refresh of a materialized view. Embodiments are not limited to any particular technique. Examples of refresh techniques include "complete refresh," "log-based refresh," and "PCT refresh," each of which is described in more detail below.

Complete Refresh

In an embodiment, a materialized view is updated using a "complete refresh" approach. Under the complete refresh approach, the defining query of the materialized view is used to compute the rows that are to be inserted into an outside table. During execution of the defining query, the materialized view may still be made available for query processing if the session in which a query is submitted is operating in a stale tolerance mode.

In contrast to complete refresh, "log-based refresh" and "PCT refresh" are incremental refresh approaches in that they compute a delta change to a materialized view, while the complete refresh approach computes the entire materialized view "from scratch."

PCT Refresh

In conventional relational database tables, rows are inserted into the table without regard to any type of ordering. Consequently, when a user submits a query that selects data from the table based on a particular value or range of values, the entire table has to be scanned to ensure that all rows that satisfy the criteria are identified. Partitioning is a technique that, in certain situations, avoids the need to search an entire table (or other database object).

With partitioning, an object, such as a database table, is divided up into sub-tables, referred to as "partitions". A common form of partitioning is referred to range partitioning. With range partitioning, each individual partition corresponds to a particular range of values for one or more columns of the table. For example, one column of a table may store date values that fall within a particular year, and the table may be divided into twelve partitions, each of which corresponds to a month of that year. All rows that have a particular month in the date column would then be inserted into the partition that corresponds to that month. In this example, partitioning the table will increase the efficiency of processing queries that select rows based on the month contained in the date column. For example, if a particular query selected all rows where month equals January, then only the partition associated with the month of January would have to be scanned.

In an embodiment, a partition change tracking (PCT) refresh technique is used to perform an out-of-place materialized view refresh. In PCT refresh, at least one base table of a materialized view is partitioned. The materialized view may or may not be partitioned. The portions of the materialized view that need to be re-computed may be derived based on the identity of the base table partitions that were changed or updated. Such portions of the materialized view are referred to herein as the "affected portions" or the "affected partitions." A base table partition that has been changed or updated and whose changes are not yet reflected in the materialized view is referred to herein as an "affected base table partition." Re-computing affected portions of a materialized view may involve executing the defining query to re-compute the affected portions based on the affected base table partition(s).

For example, if a base table is partitioned into ten partitions and only one partition has been updated since the most recent refresh of a materialized view that is based on the base table, then all unaffected portions (e.g., partitions) of the materialized view that do not correspond to the one updated partition are inserted into an outside table. The portion of the outside table that would correspond to the affected base table partition is computed by executing the defining query that targets only the one affected base table partition. Thus, PCT refresh may be much faster than a complete refresh, especially when there are relatively few affected base table partitions.

The above example involves a scenario where the materialized view is not partitioned or is partitioned but the materialized view partitions cannot be derived from the affected base table partitions (e.g., the partitioning of the materialized view is based on a different key than the key upon which the base table is partitioned.) As an example where both a base table and a materialized view are partitioned and the materialized view partitions are derivable from the base table partitions, if a base table is partitioned into ten partitions and only one partition has been updated since the most recent refresh of a materialized view that is based on the base table, then only one outside table is created for the affected materialized view partition(s) and none of the unaffected materialized view partitions even need to be read. The affected materialized view partition(s) is/are computed by executing the defining query that targets only the one affected base table partition.

Thus, instead of relying on any materialized view log or direct loader log, PCT refresh uses a partition change tracking mechanism that tracks which partitions have been updated since, for example, a most recent refresh of a particular materialized view. PCT refresh may be used if at least one of the modified base tables is partitioned and the affected base table partitions can be used to identify the affected portions of the materialized view.

A different PCT refresh approach may be used depending on whether the materialized view is partitioned. If the materialized view is not partitioned and PCT refresh has been selected, then only a single outside table is created and data is added thereto. If a materialized view is partitioned, PCT refresh has been selected and affected partition(s) of the materialized view may be derived based on the affected base table partition(s), then an outside table is created for each affected materialized view partition.

Non-Partitioned Materialized View

Figure 2:
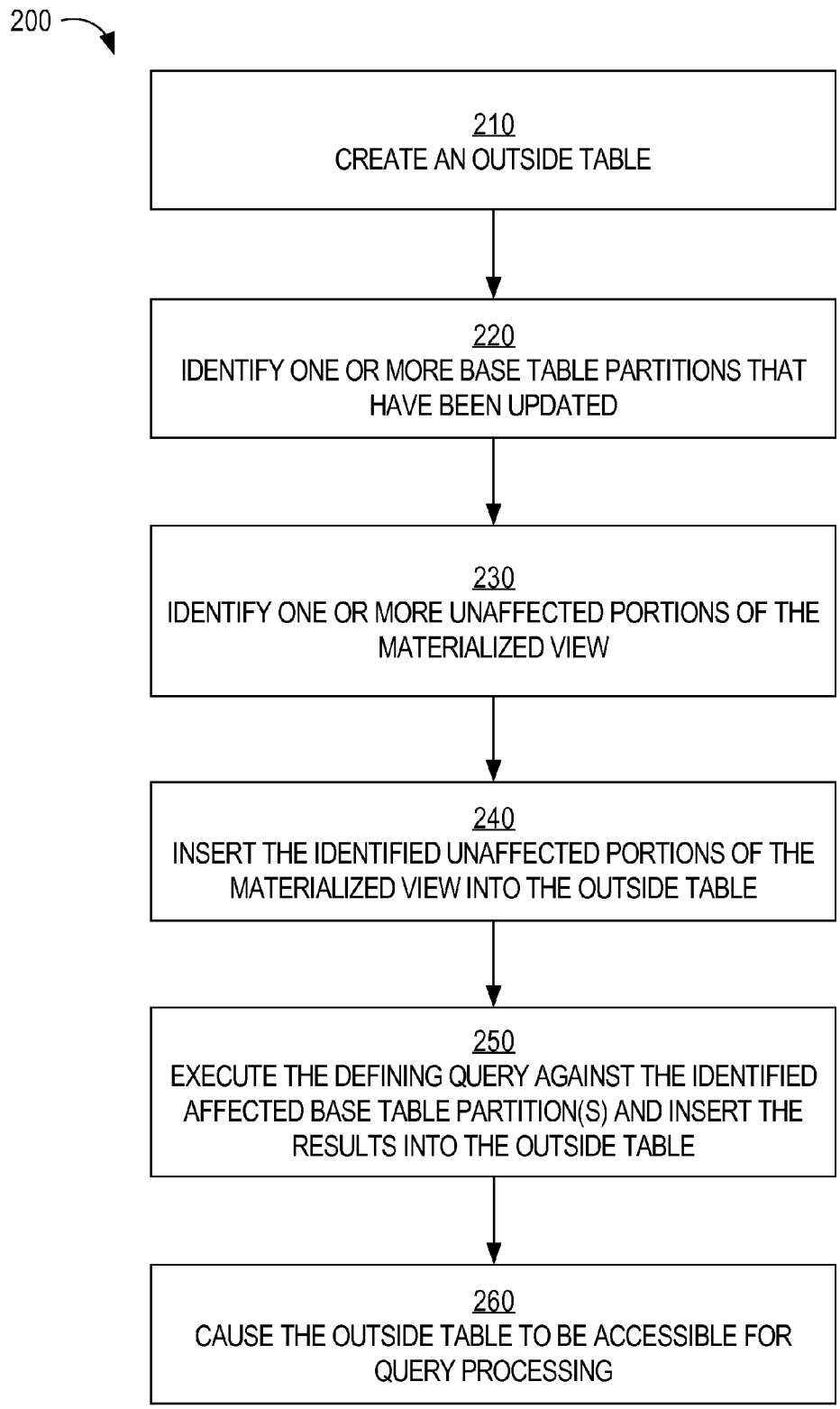
FIG. 2 is a flow diagram that depicts a process for performing an out-of-place materialized view PCT refresh when the materialized view is not partitioned, in an embodiment.

FIG. 2 is a flow diagram that depicts a process 200 for performing an out-of-place materialized view PCT refresh when the materialized view is not partitioned, in an embodiment.

Figure 3:
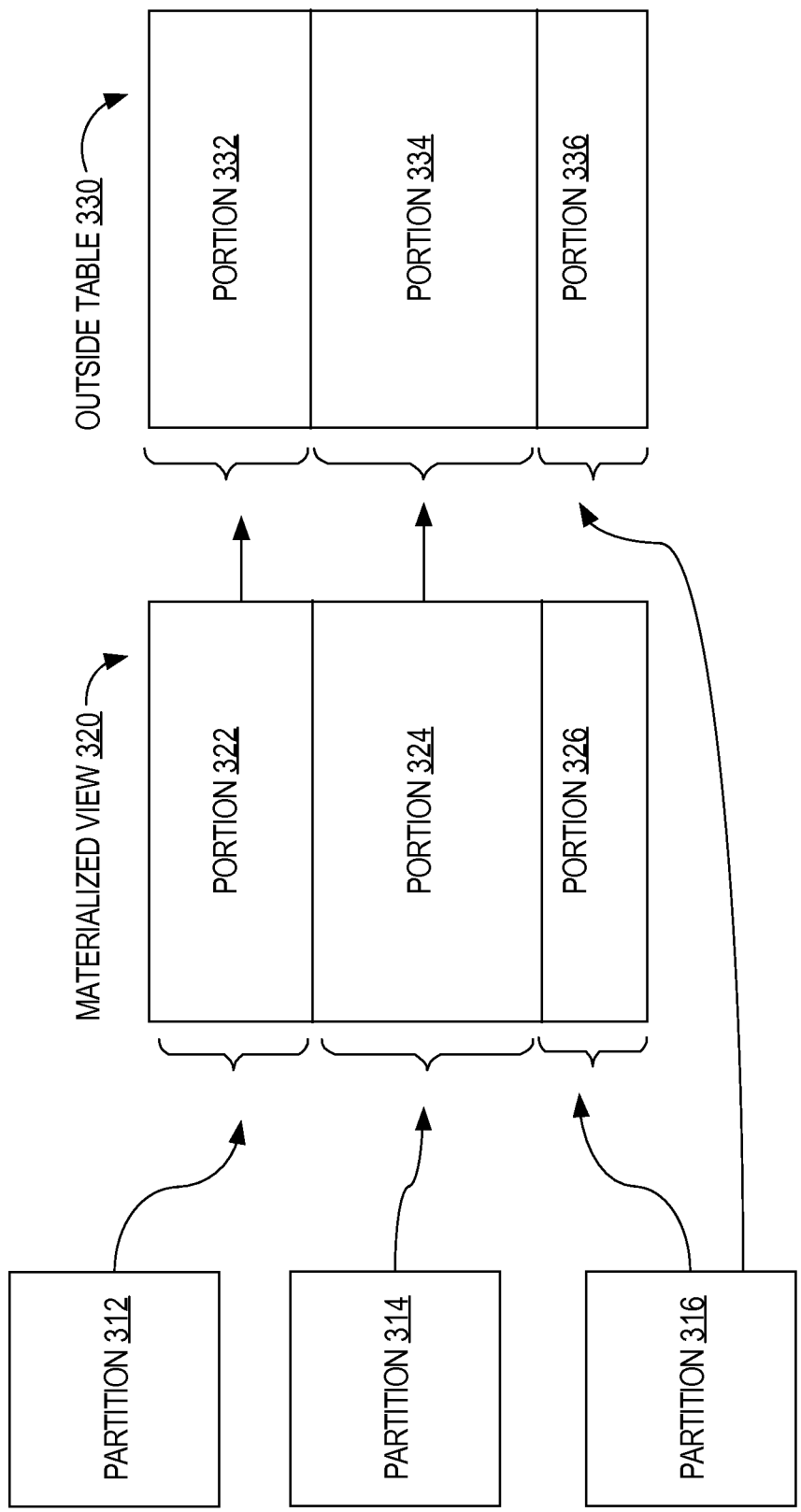
FIG. 3 is a block diagram that depicts multiple base table partitions, a materialized view, and an outside table, in an embodiment.

Process 200 is described in the context of the example in FIG. 3, which depicts three base table partitions (partitions 312, 314, and 316), a materialized view 320, and outside table 330.

At block 210, a single outside table is created. Block 210 may be the same as block 110 described previously. In the example of FIG. 3, outside table 330 is created.

At block 220, one or more affected base table partitions are identified. Block 220 may involve reading metadata associated with each base table partition to determine whether the base table partition has been updated. The metadata may include a Boolean "change" variable that, if true, indicates that the corresponding base table partition has been updated. Alternatively, the metadata may be stored on a base table basis. Such metadata may identify each base table partition that has been updated and whose changes have not yet been reflected in the materialized view. In this way, metadata at only a single location may need to be read.

In the example of FIG. 3, partition 316 is identified as being an affected base table partition while partitions 312 and 314 are "unaffected."

At block 230, one or more unaffected portions of the materialized view are identified. Block 230 may be performed by first identifying the unaffected base table partitions and then determining the portions of the materialized view that correspond to the unaffected base table partitions. In the example of FIG. 3, the unaffected base table partitions are 312 and 314 and partitions 312 and 314 correspond to portions 322 and 324 of materialized view 320.

At block 240, the identified one or more unaffected portions of the materialized view are inserted into the outside table. In the example of FIG. 3, portions 322 and 324 are inserted into outside table 330. Portion 332 of outside table 330 corresponds to portion 322 of materialized view 320 and portion 334 of outside table 330 corresponds to portion 324 of materialized view 320.

At block 250, the defining query of the materialized view is executed against the one or more affected base table partitions and the results are inserted into the outside table. In the example of FIG. 3, the defining query of materialized view 320 is executed against partition 316 and the results are inserted into outside table 330. The defining query may include a predicate that identifies partition 316 so that the other partitions are not processed. Portion 336 of outside table contains the results of the execution of the query.

At block 260, the outside table is made accessible for query processing. In the depicted example, outside table 330 is made accessible for query processing.

While process 200 is described as being performed in a particular order, embodiments are not limited to the particular order. For example, block 250 may be performed prior to blocks 230-240. As another example, blocks 230-240 may be performed prior to blocks 220 and 250. As another example, block 210 may be performed after blocks 220-230 but before blocks 240-250.

Statement A below is an example template of a database statement that may be used to populate an outside table based on unaffected portions of the materialized view.

---
STATEMENT A
---
INSERT /*+ APPEND */ INTO <outside_table>
SELECT <mv_columns>
FROM <mv_container_table_name>
WHERE NOT -- unaffected rows
(<condition_for_1st_affected_base_table_partition> or
... or
<condition_for_nth_affected_base_table_partition>);
--- where "<mv_container_table_name>" is the name of the data object that contains the data of the materialized view. Statement B below is an example template of a database statement that may be used to populate an outside table based on affected base table partitions:

---
STATEMENT B
---
INSERT /*+ APPEND */ INTO <outside_table>
SELECT <mv_defining_query_select_list>
FROM <base_table_names>
WHERE -- affected rows
<condition_for_1st_affected_base_table_partition> or
... or
<condition_for_nth_affected_base_table_partition>
GROUP BY <mv_defining_query_group_by_columns>;
---

As a more specific example of PCT refresh when the base table is partitioned and the materialized view is not partitioned, consider statements C and D.

---

STATEMENT C

---

CREATE TABLE lineitem (
l_shipdate not null,
l_orderkey not null,
...)
partition by range (l_shipdate)
(partition item01 values less than (to_date('1992-01-01',),
partition item02 values less than (to_date('1992-02-01',),
...
partition item89 values less than (to_date('1999-05-01',)),
partition itemmax values less than (maxvalue)
);

---

STATEMENT D

---

CREATE MATERIALIZED VIEW mav_q1
AS
SELECT l_shipdate, l_linestatus, sum(l_quantity) as sum_qty,
count(l_quantity) as count_qty, count(*) as count_star
FROM lineitem
GROUP BY l_shipdate, l_linestatus;

---

Processing of Statement C by a database server causes a base table labeled "lineitem" to be created and partitioned according to the specified partitioning criteria. Processing of Statement D by a database server causes a materialized view labeled "mav_q1" to be created. In this example, the lineitem table is partitioned by the l_shipdate column on a monthly basis, but the materialized view is not partitioned.

Based on the above scenario and the determination that rows in base table partitions item88 and item89 have been modified, the following statements (Statements E and F) may be used to populate a single outside table:

---

STATEMENT E

---

INSERT /*+ APPEND */ INTO <outside_table>
SELECT l_shipdate, l_linestatus, sum_qty, count_qty, count_star
FROM mav_q1
WHERE NOT
    ((l_shipdate < to_date('1999-04-01') and
    l_shipdate >= to_date('1999-03-01')) OR
    (l_shipdate < to_date('1999-05-01') and
    l_shipdate >= to_date('1999-04-01')));

---

STATEMENT F

---

INSERT /*+ APPEND */ INTO <outside_table>
SELECT l_shipdate, l_linestatus, sum(l_quantity) as sum_qty,
    count(l_quantity) as count_qty, count(*) as count_star
FROM lineitem
WHERE
    (l_shipdate < to_date('1999-04-01') and
    l_shipdate >= to_date('1999-03-01')) OR
    (l_shipdate < to_date('1999-05-01') and
    l_shipdate >= to_date('1999-04-01'))
GROUP BY l_shipdate, l_linestatus;

---

Processing of Statement E by a database server causes data from unaffected portions of the materialized view to be inserted into the outside table. Processing of Statement F by a database server causes data from the affected portions of the lineitem table to be inserted into the outside table.

Partitioned Materialized View

Figure 4:
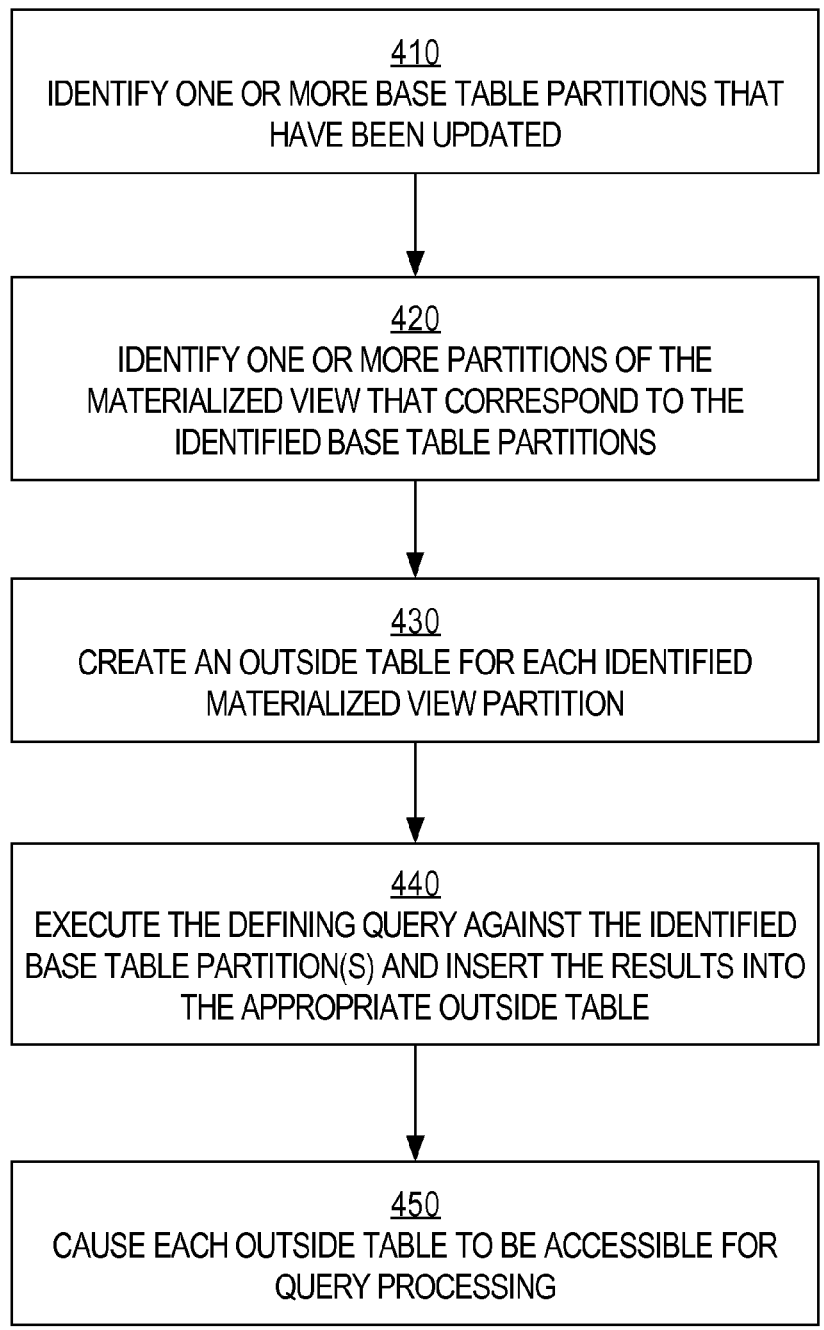
FIG. 4 is a flow diagram that depicts a process for performing an out-of-place materialized view PCT refresh when the materialized view is partitioned, in an embodiment.

FIG. 4 is a flow diagram that depicts a process 400 for performing an out-of-place materialized view PCT refresh when the materialized view is partitioned, in an embodiment.

At block 410, one or more affected base table partitions (i.e., that have been updated but whose changes are not yet reflected in the materialized view) are identified. Block 410 may be similar to block 220 of FIG. 2.

At block 420, one or more affected partitions of the materialized view that correspond to the identified base table partitions are identified. In some cases, there is a one-to-one mapping of base table partitions to materialized view partitions. For example, a base table is partitioned into four partitions and a materialized view is partitioned into four partitions, and each base table partition corresponds to a different one of the four materialized view partitions.

In some cases, even though one or more base tables are partitioned on the same key as the materialized view, there is a many-to-one mapping or a one-to-many mapping of base table partitions to materialized view partitions. For example, a base table and a materialized view may be partitioned based on date, but the base table is partitioned based on quarters (or 3-month increments) while the materialized view is partitioned based on months. Thus, one base table partition may map to three materialized view partitions.

As another example, a base table and a materialized view may be partitioned based on a salary range, but the base table is partitioned based on a salary range that is at a lower level of granularity (e.g., $5,000 increments) while the materialized view is partitioned based on a higher level of granularity (e.g., $10,000). Thus, if the ranges are aligned, then two base table partitions may map to one materialized view partitions. If the ranges are not aligned, then three base table partitions may map to one materialized view partition.

At block 430, an outside table is created for each identified materialized view partition. For example, if a materialized view is partitioned into partitions MVP1, MVP2, and MVP3 and it is determined that MVP1 and MVP3 correspond to the affected base table partitions, then two outside tables are created: one for MVP 1 (e.g., OTP1) and one for MVP3 (e.g., OTP 3).

At block 440, the defining query of the materialized view is executed against the one or more affected base table partitions and the results are inserted into the appropriate outside table. Continuing with the example in block 430, if affected base table partitions are BTP1 and BTP3 and each affected base table partition corresponds to a different one of materialized view partitions MVP1 and MVP3, then a defining query of the materialized view is executed against BTP1 and BTP3. The results of executing the defining query against BTP1 are inserted into OTP1 and the results of executing the defining query against BTP3 are inserted into OTP 3.

At block 450, each created outside table is made accessible for query processing. Continuing with the example of block 440, OTP1 and OTP3 are made accessible for query processing. If only one outside table was created in block 430, then only one outside table is made accessible for query processing.

While process 400 is being performed, any queries that target an unaffected materialized view partition will be able to "see" current or "fresh" data. If a query requires an affected materialized view partition to be read, then, while process 400 is being performed, the query may process "stale" data.

Statement G below is an example template of a database statement that may be used to populate one or more outside tables based on affected base table partitions:

---
STATEMENT G
---
```
INSERT /*+ APPEND */ ALL
        when <partition_condition_for_1st_affected_partition> then
                into <outside_table_for_mv_partition_1>
        ...
        when <partition_condition_for_nth_affected_partition> then
                into <outside_table_for_mv_partition_n>
SELECT <mv_columns>
FROM <base_tables>
WHERE <condition_for_1st_affected_base_table_partition>
        OR ...
        OR <condition_for_nth_affected_base_table_partition>
GROUP BY <group_by_columns>;
```
---

As a more specific example of PCT refresh when both the base table and the materialized view are partitioned, consider statements H and I.

---
STATEMENT H
---
```
CREATE TABLE lineitem (
    l_shipdate not null,
    l_orderkey not null,
    ...)
partition by range (l_shipdate)
(partition item01 values less than (to_date('1992-01-01',),
partition item02 values less than (to_date('1992-02-02',),
...
partition item89 values less than (to_date('1999-05-01',)),
partition itemmax values less than (maxvalue)
);
```
---

---
STATEMENT I
---
```
CREATE MATERIALIZED VIEW mav_q1
partition by range (l_shipdate)
(partition item01 values less than (to_date('1992-01-01')),
partition item02 values less than (to_date('1992-02-01')),
...
partition item89 values less than (to_date('1999-05-01',)),
partition itemmax values less than (MAXVALUE)
)
AS
SELECT l_shipdate, l_linestatus, sum(l_quantity) as sum_qty,
    count(l_quantity) as count_qty, count(*) as count_star
FROM lineitem
GROUP BY l_shipdate, l_linestatus;
```
---

Processing of Statement H by a database server causes a base table labeled "lineitem" to be created and partitioned according to the specified criteria. Processing of Statement I by a database server causes a materialized view labeled "mav_q1" to be created and partitioned according to the specified partitioning criteria. In this example, both the lineitem table and the materialized view are partitioned by the l_shipdate column on a monthly basis. Therefore, the affected materialized view partitions may be derived by the affected base table partitions.

In an embodiment, the partition boundaries are stored in a partition metadata table. Once a base table partition is modified, either by DDLs or by partition maintenance operations (PMOPs), the partition change tracking mechanism is able to retrieve the boundaries of the affected base table partitions. The PCT refresh process may uses the partition boundaries to generate the predicates in the WHERE clause of the refresh statement.

Based on the above scenario and the determination that rows in base table partitions item88 and item89 have been modified, the following statement (Statement J) may be used to populate two outside tables:

---
STATEMENT J
---
```
INSERT /*+ APPEND */ ALL
        when l_shipdate < to_date('1999-04-01')
                and l_shipdate >= to_date('1999-03-01')
        then into outside_table_1
        when l_shipdate < to_date('1999-05-01')
                and l_shipdate >= to_date('1999-04-01')
        then into outside_table_2
SELECT l_shipdate, l_linestatus, sum(l_quantity) as sum_qty,
    count(l_quantity) as count_qty, count(*) as count_star
FROM lineitem
WHERE (l_shipdate<to_date('1999-04-01') and
        l_shipdate >= to_date('1999-03-01'))
    OR (l_shipdate<to_date('1999-05-01') and
        l_shipdate >= to_date('1999-04-01'))
GROUP BY l_shipdate, l_linestatus;
```
---

In an embodiment, once the outside table(s) have been populated using out-of-place PCT refresh where the materialized view is partitioned, the causing step (in block 130) is performed in response to a DDL statement for each affected materialized view partition. An example of such a DDL statement is as follows:

---
```
ALTER TABLE <mv_container_table_name>
EXCHANGE PARTITION <affected_partition_i>
WITH TABLE <outside_table_i>
INCLUDING INDEXES;
```
---

In a related embodiment, a WITHOUT VALIDATION option is added to the ALTER TABLE statement to reduce the execution time. This option may be possible if the correctness of the refresh statements is guaranteed.

Log-Based Refresh

When updating one or more base tables that are associated with a materialized view, one or more logs may be maintained separate from the one or more base tables. The one or more logs indicate the changes that were made to the one or more base tables (such as inserts, deletes, and updates) and that have not yet been applied to the materialized view. Each of one or more logs is referred to herein as a "materialized view log." A separate materialized view log may be maintained for each base table upon which a materialized view is based. Alternatively, if a materialized view is based on multiple base tables, then a single materialized view log may be maintained for the multiple base tables.

In an embodiment, a materialized view is associated with one or more materialized view logs and one or more other logs. For example, all the base tables (which may be one) of a materialized view may have certain updates recorded in a log that is separate from the one or more materialized views. Specifically, the separate log may be referred to as a "direct loader log," which stores direct path inserts that were made to the base table(s). All the base table(s) may share the same direct loader log.

In an embodiment, one or more materialized view logs (and, optionally, one or more other logs), one or more base tables, and the materialized view container table are used to populate an outside table when performing an out-of-place refresh of a materialized view. This approach is referred to herein as "log-based refresh" and involves combining data from the materialized view ("MV data") and data from each materialized view log ("MV log data").

In combining MV data and MV log data: (1) MV data that is indicated as deleted in the MV log data will not be added to the outside table; (2) MV data that is indicated as updated in MV log data will be modified as indicated in MV log data and then added to the outside table; and (3) data that is indicated as inserted in MV log data is added to the outside table. These three main operations may be performed in any order. Alternatively, the order in which the changes that are reflected in the materialized view logs may be followed when adding data to the outside table. The order may be important if, for example, a materialized view log indicates that a row was inserted and then later deleted. If deletions are processed before insertions, then the outside table would include the row, which is not consistent with the base table(s).

In an embodiment, different approaches for performing log-based refresh may be used depending on the type of materialized view. One type of materialized view is referred to herein as a "materialized aggregate view" (MAV), which is a materialized view whose defining query contains aggregates. The defining query of a MAV may or may not contain joins. MAV whose defining query does not contain any join is referred to herein as a "MAV-1." Another type of materialized view is referred to herein as a "materialized join view" (MJV), which is a materialized view whose defining query contains one or more joins, but no aggregates.

The following is an example template formula for a log-based refresh of a MAV. In this example, the MAV has a defining query that joins n tables T1, T2, . . . , Tn and that includes group by and aggregations. Formula A may be used to compute the "delta" materialized view denoted as ΔMV. Here, Ti ($1 \leq I \leq n$) denotes the pre-image of the n tables, Ti' ($1 \leq I \leq n$) denotes the post-image of the n tables, and ΔTi ($1 \leq I \leq n$) denotes the delta change to the n tables. Also, ⋈ denotes the join operation, U denotes the UNION ALL operation, and g( ) denotes the group by and aggregation operations, if any.

ΔMV=g(ΔT1⋈ T2⋈ T3⋈ . . . ⋈ Tn)
U g(T1'⋈ ΔT2⋈ T3⋈ . . . ⋈ Tn)
U g(T1'⋈ T2'⋈ ΔT3⋈ . . . ⋈ Tn)
U . . .
U g(T1'⋈ T2'⋈ T3'⋈ . . . ⋈ ΔTn)

FORMULA A

Once the delta materialized view is computed, the following example template statement may be used to populate an outside table:

---
STATEMENT K

INSERT /*+ APPEND */ INTO <outside_table>
SELECT * from
    (select
        case when mv_oj is null then
            delta_mv.group_by_key -- new rows
            when delta_oj is null then
                mv.group_by_key -- unaffected rows
            else mv.group_by_key -- affected rows
---

-continued
---
STATEMENT K end group_by,
        case when mv_oj is null then delta_mv.aggregates --
            new rows
            when delta_oj is null then mv.aggregates --
                unaffected rows
            else combine(mv.aggregates,
                delta_mv.aggregates) -- affected rows
        end aggregates,
    from (select 1 mv_oj, mv.* from mv) mv
        full outer join
        (select 1 delta_oj, delta.*
         from <expression_to_compute_delta_mv> delta)
         delta_mv
         on mv.group_by_key = delt_mv.group_by_key
    )
WHERE count_star != 0; -- filter out the deleted rows
---

Statement K specifies a full outer join of the materialized view and the delta materialized view. In contrast, an in-place log-based refresh statement would specify an inner join of the materialized view and a delta materialized view. For each row in the full outer join result, if the materialized view outer join marker named mv_oj is NULL, then the row is a new row to the materialized view. If the delta materialized view outer join marker named delta_oj is NULL, then the row is an existing row in the materialized view which is not affected by the base table changes. If neither mv_oj nor delta_oj is NULL, then the row is an existing row in the materialized view which is affected by the base table changes and needs to be updated. All three types of rows are merged and inserted into the outside table. Rows associated with count_star=0 (i.e., count(*)=0) are filtered out because those rows no longer have any contributing rows from the base table(s) and should be deleted from the materialized view.

A different approach may be used for a MJV. Once a delta materialized view is computed (e.g., using FORMULA A, but without the aggregations (i.e., g( )), the following example template statement may be used to populate an outside table:

---
STATEMENT L

INSERT /*+ APPEND */ INTO <outside_table>
SELECT * --unaffected rows in materialized view
FROM <mv_container_table_name>
WHERE T1_rowid not in (select m_row$$ from mlog$_T1) and
    ...
    Tn_rowid not in (select m_row$$ from mlog$_Tn)
UNION ALL
SELECT<mv_columns> -- ΔT$_1$⋈ T$_2$⋈...⋈ T$_n$
FROM (select * from T1 where rowid in
        (select m_row$$ from mlog$_T1)) delta_T1,
    pre-image(T2) pre_T2,
    ...
    pre-image(Tn) pre_Tn
WHERE <join_conditions_of_mv_defining query>
UNION ALL
...
UNION ALL
SELECT <mv_columns> -- T$_1$'⋈ T$_2$'⋈...⋈ ΔT$_n$
FROM T1 post_T1,
    T2 post_T2,
    ...
    (select * from Tn where rowid in
        (select m_row$$ from mlog_Tn)) delta_Tn
WHERE <join_conditions_of_mv_defining query>;
--- where mlog$_Ti is a materialized view log of table Ti and m_row&& is a rowid of a materialized view log.

Selecting a Refresh Technique

In an embodiment, a particular out-of-place refresh technique is selected from among multiple possible out-of-place refresh techniques. For example, a database server selects a log-based refresh technique from among refresh techniques that include complete refresh and PCT refresh. The selection of a particular refresh technique may be based on one or more criteria, such as an estimated cost of performing each refresh technique or the size of certain database objects. For example, if one or more materialized view logs are larger than a particular size, then complete refresh is performed. As another example, if the number of partitions of one or more base tables of a materialized view have been updated since the last refresh of the materialized view is less than a particular number, then a PCT refresh technique is performed. Some out-of-place refresh techniques may not be possible if, for example, materialized view log(s) are not maintained and/or there is no partition change tracking mechanism. This is also the case for in-place refresh.

Benefits

In in-place materialized view refresh, a materialized view typically becomes fragmented, which affects execution performance of later queries or refreshes. Fragmentation may occur when data is deleted from a materialized view and new data that is added to the materialized view is unable to be inserted into the storage region previously occupied by the deleted data. In contrast, in embodiments, an outside table is created from "scratch" and so there is no fragmentation, at least initially when the outside table is fully populated during the "rename" step.

In in-place materialized view refresh, conventional DML statements, including insert, delete, and update, may be employed when performing the refresh. In contrast, in embodiments, direct path insert statements are used to populate an outside table and deleting and updating rows may be avoided entirely. Thus, in embodiments, a buffer cache is not required, data is only appended to an outside table, referential integrity constraints are not checked, and/or redo and undo log entries are not created during inserts of data into an outside table In in-place materialized view refresh performed in non-atomic mode, a materialized view may be truncated and then "re-filled" with data. However, a query that targets the materialized view may not be able to "see" any data in the materialized view immediately after this truncate step. In contrast, in embodiments, a materialized view that is subject to an out-of-place refresh may be available for query rewrite while a corresponding outside table is being created and data is being added thereto.

In in-place materialized view refresh performed in atomic mode, even though stale results are available during the refresh, the refresh takes a considerable amount of time to perform. In contrast, in embodiments, a materialized view that is subject to an out-of-place refresh takes considerably less time to perform than atomic refresh. This may be due to direct path insert statement(s) that are used to populate an outside table.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
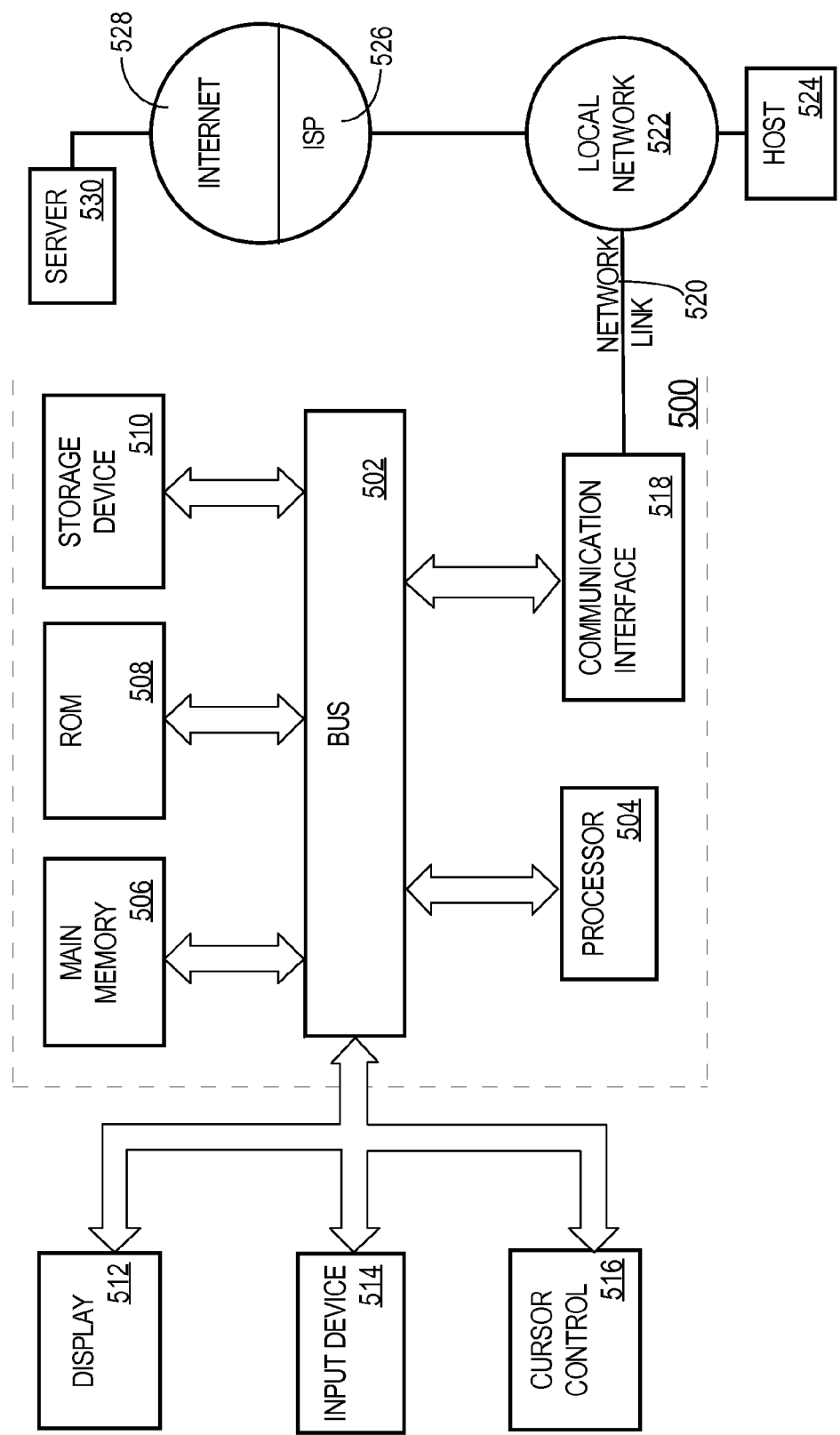
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hardwired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   determining to update a materialized view that is based on one or more base tables and a defining query that is used to create the materialized view when executed against the one or more base tables;
   wherein the determining comprises determining that one or more changes have been made to at least one of the one or more base tables and have not been made to the materialized view;
   in response to determining to update the materialized view:
      creating a database object that is separate from the materialized view and the one or more base tables;
      generating first data for insertion into the database object, wherein generating the first data comprises retrieving second data from the one or more base tables upon which the materialized view is based, wherein the first data includes the second data;
      inserting the first data into the database object;
      causing the database object to be accessible for query processing in place of the materialized view;
   after creating the database object and prior to causing the database object to be accessible for query processing in place of the materialized view:
      receiving a query that targets the materialized view;
      in response to receiving the query:
         determining that a first portion of the materialized view corresponds to one or more first portions, of a plurality of portions of the one or more base tables, that have not been modified since a most recent update of the materialized view;
         retrieving first results of the query based on analyzing the first portion;
         determining that a second portion of the materialized view corresponds to one or more second portions, of the plurality of portions of the one or more base tables, that have been modified since the most recent update of the materialized view;
         identifying the one or more second portions, of the one or more base tables, that correspond to the second portion of the materialized view;

retrieving second results of the query based on analyzing the one or more second portions of the one or more base tables;
wherein the method is performed by one or more computing devices.

2. The method of claim 1, wherein causing the database object to be accessible for query processing comprises associating a name of the materialized view with the database object.

3. A method comprising:
determining to update a materialized view that is based on one or more base tables and a defining query that is used to create the materialized view when executed against the one or more base tables;
wherein the determining comprises determining that one or more changes have been made to at least one of the one or more base tables and have not been made to the materialized view;
in response to determining to update the materialized view:
  creating a database object that is separate from the materialized view and the one or more base tables;
  generating first data for insertion into the database object, wherein generating the first data comprises retrieving second data from the one or more base tables upon which the materialized view is based, wherein the first data includes the second data;
  wherein the first data comprises a plurality of portions;
  inserting the first data into the database object;
  wherein inserting the first data into the database object comprises, for each portion of the plurality of portions, performing a direct path insert operation to append said each portion to the database object;
  causing the database object to be accessible for query processing in place of the materialized view.

4. The method of claim 1, wherein generating the first data comprises:
executing a second query that defines the materialized view and that is processed
against the one or more base tables upon which the materialized view is based;
wherein executing the second query causes result data to be identified;
wherein the result data is the first data.

5. The method of claim 1, wherein generating the first data comprises:
determining which partitions of a plurality of partitions of the one or more base tables have been modified;
wherein determining which partitions comprises identifying a set of one or more partitions of the plurality of partitions;
executing a second defining query that is associated with the materialized view and that includes one or more conditions that excludes each partition of the plurality of partitions that is not in the set of one or more partitions, wherein executing the second defining query causes result data to be identified;
wherein the result data is a first subset of the first data.

6. The method of claim 5, wherein generating the first data further comprises:
identifying, of the materialized view, one or more portions that correspond to one or more partitions, of the plurality of partitions of the one or more base tables, that have not been modified since the most recent update of the materialized view;
wherein the one or more portions are a second subset of the first data;
wherein the second subset is different than the first subset.

7. The method of claim 1, wherein:
the materialized view is partitioned into a plurality of view partitions and the one or more base tables are partitioned into a plurality of table partitions prior to determining to update the materialized view;
generating the first data comprises:
  determining which partitions of the plurality of table partitions of the one or more base tables have been modified,
  wherein determining which partitions comprises identifying a set of one or more table partitions of the plurality of table partitions;
  identifying one or more view partitions of the plurality of view partitions that correspond to the set of one or more table partitions;
creating the database object comprises creating one or more database objects, each corresponding to a different view partition of the one or more view partitions;
generating the first data comprises executing one or more queries, each of which is processed against one or more table partitions in the set of one or more table partitions, wherein executing the one or more queries causes result data to be identified;
the first data is at least a subset of the result data.

8. The method of claim 7, wherein the number of the one or more database objects is less than the number of the plurality of view partitions.

9. The method of claim 1, further comprising:
prior to determining to update the materialized view:
  generating a materialized view log that is separate from the materialized view and the one or more base tables;
  storing changes that are made to one or more of the one or more base tables in the materialized view log;
wherein generating the first data comprises combining third data from the materialized view with fourth data from the materialized view log.

10. The method of claim 9, wherein combining comprises performing a full outer join operation between the third data and the fourth data.

11. One or more storage media storing instructions which, when executed by one or more processors, cause:
determining to update a materialized view that is based on one or more base tables and a defining query that is used to create the materialized view when executed against the one or more base tables;
wherein the determining comprises determining that one or more changes have been made to at least one of the one or more base tables and have not been made to the materialized view;
in response to determining to update the materialized view:
  creating a database object that is separate from the materialized view and the one or more base tables;
  generating first data for insertion into the database object, wherein generating the first data comprises retrieving second data from the one or more base tables upon which the materialized view is based, wherein the first data includes the second data;
  inserting the first data into the database object;
  causing the database object to be accessible for query processing in place of the materialized view;
after creating the database object and prior to causing the database object to be accessible for query processing in place of the materialized view:
  receiving a query that targets the materialized view;

in response to receiving the query:
  determining that a first portion of the materialized view corresponds to one or more first portions, of a plurality of portions of the one or more base tables, that have not been modified since a most recent update of the materialized view;
  retrieving first results of the query based on analyzing the first portion;
  determining that a second portion of the materialized view corresponds to one or more second portions, of the plurality of portions of the one or more base tables, that have been modified since the most recent update of the materialized view;
  identifying the one or more second portions, of the one or more base tables, that correspond to the second portion of the materialized view;
  retrieving second results of the query based on analyzing the one or more second portions of the one or more base tables.

12. The one or more storage media of claim 11, wherein causing the database object to be accessible for query processing comprises associating a name of the materialized view with the database object.

13. One or more storage media storing instructions which, when executed by one or more processors, cause:
  determining to update a materialized view that is based on one or more base tables and a defining query that is used to create the materialized view when executed against the one or more base tables;
  wherein the determining comprises determining that one or more changes have been made to at least one of the one or more base tables and have not been made to the materialized view;
  in response to determining to update the materialized view:
    creating a database object that is separate from the materialized view and the one or more base tables;
    generating first data for insertion into the database object, wherein generating the first data comprises retrieving second data from the one or more base tables upon which the materialized view is based, wherein the first data includes the second data;
    wherein the first data comprises a plurality of portions;
    inserting the first data into the database object
    wherein inserting the first data into the database object comprises, for each portion of the plurality of portions, performing a direct path insert operation to append said each portion to the database object.

14. The one or more storage media of claim 11, wherein generating the first data comprises:
  executing a second query that defines the materialized view and that is processed
    against the one or more base tables upon which the materialized view is based;
  wherein executing the second query causes result data to be identified;
  wherein the result data is the first data.

15. The one or more storage media of claim 11, wherein generating the first data comprises:
  determining which partitions of a plurality of partitions of the one or more base tables have been modified;
  wherein determining which partitions comprises identifying a set of one or more partitions of the plurality of partitions;
  executing a second defining query that is associated with the materialized view and that includes one or more conditions that excludes each partition of the plurality of partitions that is not in the set of one or more partitions, wherein executing the second defining query causes result data to be identified;
  wherein the result data is a first subset of the first data.

16. The one or more storage media of claim 15, wherein generating the first data further comprises:
  identifying, of the materialized view, one or more portions that correspond to one or more partitions, of the plurality of partitions of the one or more base tables, that have not been modified since the most recent update of the materialized view;
  wherein the one or more portions are a second subset of the first data;
  wherein the second subset is different than the first subset.

17. The one or more storage media of claim 11, wherein:
  the materialized view is partitioned into a plurality of view partitions and the one or more base tables are partitioned into a plurality of table partitions prior to determining to update the materialized view;
  generating the first data comprises:
    determining which partitions of the plurality of table partitions of the one or more base tables have been modified,
    wherein determining which partitions comprises identifying a set of one or more table partitions of the plurality of table partitions;
    identifying one or more view partitions of the plurality of view partitions that correspond to the set of one or more table partitions;
  creating the database object comprises creating one or more database objects, each corresponding to a different view partition of the one or more view partitions;
  generating the first data comprises executing one or more queries, each of which is processed against one or more table partitions in the set of one or more table partitions, wherein executing the one or more queries causes result data to be identified;
  the first data is at least a subset of the result data.

18. The one or more storage media of claim 17, wherein the number of the one or more database objects is less than the number of the plurality of view partitions.

19. The one or more storage media of claim 11, wherein generating the first data comprises combining third data from the materialized view with fourth data from one or more log files that are associated with the one or more base tables that are associated with the materialized view.

20. The one or more storage media of claim 19, wherein combining comprises performing a full outer join operation between the third data and the fourth data.

21. A method comprising:
  determining to update a materialized view that is based on one or more base tables and a defining query that is used to create the materialized view when executed against the one or more base tables;
  wherein the determining comprises determining that one or more changes have been made to at least one of the one or more base tables and have not been made to the materialized view;
  in response to determining to update the materialized view:
    creating a plurality of database objects that are separate from the materialized view and the one or more base tables and that includes the database object;
    for each database object of the plurality of database objects, generating first data for insertion into said each database object, wherein generating the first data comprises retrieving second data from the one or more base tables upon which the materialized view is based, wherein the first data includes the second data;

for each database object of the plurality of database objects, inserting the different first data corresponding to said each database object into said each database object;

causing the plurality of database objects to be accessible for query processing in place of the materialized view.

22. The method of claim 21, further comprising, after creating the database object and prior to causing the database object to be accessible, making the materialized view available to one or more queries that target the materialized view.

23. One or more storage media storing instructions which, when executed by one or more processors, cause:

determining to update a materialized view that is based on one or more base tables and a defining query that is used to create the materialized view when executed against the one or more base tables;

wherein the determining comprises determining that one or more changes have been made to at least one of the one or more base tables and have not been made to the materialized view;

in response to determining to update the materialized view:

creating a plurality of database objects that are separate from the materialized view and the one or more base tables and that includes the database object;

for each database object of the plurality of database objects, generating first data for insertion into said each database object, wherein generating the first data comprises retrieving second data from the one or more base tables upon which the materialized view is based, wherein the first data includes the second data;

for each database object of the plurality of database objects, inserting the first data corresponding to said each database object into said each database object;

causing the plurality of database objects to be accessible for query processing in place of the materialized view.

24. The one or more storage media of claim 23, wherein the instructions, when executed by the one or more processors, further cause, after creating the database object and prior to causing the database object to be accessible, making the materialized view available to one or more queries that target the materialized view.

* * * * *

UNITED STATES PATENT AND TRADEMARK OFFICE
CERTIFICATE OF CORRECTION

PATENT NO. : 9,454,572 B2  Page 1 of 1
APPLICATION NO. : 13/826726
DATED : September 27, 2016
INVENTOR(S) : Ding et al.

It is certified that error appears in the above-identified patent and that said Letters Patent is hereby corrected as shown below:

In the Specification

In Column 10, Line 46, delete "OTP 3)." and insert -- OTP3). --, therefor.

In Column 10, Line 58, delete "OTP 3." and insert -- OTP3. --, therefor.

In Column 15, Line 45, after "table" insert -- . --.

In the Claims

In Column 23, Line 5, in Claim 21, after "the" delete "different".

Signed and Sealed this
Sixth Day of June, 2017

Michelle K. Lee
*Director of the United States Patent and Trademark Office*